United States Patent [19]
Copen et al.

[11] Patent Number: 5,201,660
[45] Date of Patent: Apr. 13, 1993

[54] KIT AND METHOD FOR DEMONSTRATING COURTROOM AND TRIAL PROCEDURE

[76] Inventors: Lynn Copen, 4109 - 86th St., Kenosha, Wis. 53142; Harvey Knapp, 5103 - 30th Ave., Kenosha, Wis. 53140

[21] Appl. No.: 853,096

[22] Filed: Mar. 18, 1992

[51] Int. Cl.⁵ .................................................. G09B 25/00
[52] U.S. Cl. .................................... 434/365; 446/75; 446/476; 434/236
[58] Field of Search .................. 446/73, 75, 268, 476, 446/479, 482; 434/305, 235, 236, 365

[56] References Cited

U.S. PATENT DOCUMENTS

| | | | |
|---|---|---|---|
| 4,077,152 | 3/1978 | Newsom et al. | 446/476 |
| 4,804,349 | 2/1989 | Loscalzo et al. | 446/471 X |
| 4,818,233 | 4/1989 | Behan | 446/268 X |

FOREIGN PATENT DOCUMENTS 874057 4/1953 Fed. Rep. of Germany ...... 434/236

Primary Examiner—Gene Mancene
Assistant Examiner—L. Thomas
Attorney, Agent, or Firm—Jansson & Shupe, Ltd.

[57] ABSTRACT

A kit and method for visual demonstration of courtroom and trial principles as related to testimony and procedures for the elicitation of such testimony from children, in particular. The kit includes a horizontal base member representing a courtroom and a plurality of interrelated figurine and fixture members, and may include means to removably engage the fixtures and figurines with the base, such that apprehension and concerns over courtroom appearance and testimony are alleviated through assembly and manipulation of the kit components.

20 Claims, 4 Drawing Sheets

KIT AND METHOD FOR DEMONSTRATING COURTROOM AND TRIAL PROCEDURE

FIELD OF THE INVENTION

This invention is related generally to visual demonstrations of courtroom and trial principles and, more particularly, to methods and means for demonstrating procedures relating to the elicitation of courtroom testimony.

BACKGROUND OF THE INVENTION

Daily newspapers, not to mention radio and television news coverage, are replete with the unfortunate accounts of crimes involving children, either as victims or witnesses. Inasmuch as the legal system mirrors society at large, an ever-increasing number of children are faced with the prospect of testifying at trials and similar legal proceedings. Indeed, in many instances, successful criminal prosecution depends wholly upon the testimony of a child and his/her ability to convey pertinent information while on the witness stand.

However, the admissibility of a child's testimony is problematical. Admissibility depends, in part, upon a child's understanding of the concept of truth, as well as whether his/her communication skills are sufficient to allow the presentation of relevant testimony.

Early concern over such testimony and the problems associated therewith resulted in numerous procedural mechanisms by which to assess or gage a child's testimony and the admissibility thereof as evidence. For instance, various jurisdictions, as a matter of legislative enactment, provide comprehensive rules for pre-trial depositions. Proceeding in this manner alleviates some concerns, but does not address others. While pre-trial deposition techniques may satisfy veracity, recollection and communication concerns, they do nothing to prepare a child for the intimidating experience of live courtroom testimony. Fear and apprehension caused by a multitude of unfamiliar faces in a strange physical surrounding often hinder, if not altogether prevent, the presentation of competent testimony.

The search for an efficient, effective means by which to introduce children to courtroom and trial procedure, meeting the requirements stated above, has been an ongoing concern. Several approaches have been used with certain success. Guided courtroom tours and video presentations provide a degree of familiarity such that useful testimony may be elicited when needed.

However, the prior art has associated with it a number of significant problems and deficiencies. Most are related to the apparatus and methods currently used and result from the unique and limited comprehension abilities of children.

One major problem is that courtroom touring is ineffective. Such a tour must be conducted when court is not in session or the courtroom is not otherwise in use. Despite explanations to the contrary, later introduction of previously unseen individuals creates an intimidation factor which impairs a child's ability to provide the most useful testimony possible.

Another related problem is that time and scheduling constraints prevent repeat demonstration and instruction. More often that not, a single courtroom tour proves insufficient by way of alleviating apprehension and concerns over testimony. A second or third tour may be unavailable. Likewise, given the case loads experienced by social service personnel, victim/witness coordinators and the like, demonstrations are often conducted during weekend and evening hours when courts are inaccessible.

Another related problem is that courtroom tours and, to a lesser extent, video demonstrations, are not presented in a setting within which a child feels most comfortable. Merely walking into a courtroom creates a barrier to the full comprehension of any accompanying explanation. Viewing a video presentation in an unfamiliar office or facility may also limit the full utility of such efforts.

Another significant problem is that child witnesses present themselves in various stages of educational and intellectual development. Whereas one demonstration technique may suffice for one, it may be beyond the comprehension of another. With video and like demonstrations, especially, adaptation to a particular child and a particular testimony context is difficult, at best.

In summary, a considerable number of drawbacks and problems exist in the art relating to visual demonstration of courtroom and trial procedure. There is a need for an improved method and means by which to elicit competent child testimony and overcome children's often complete and debilitating bewilderment concerning his/her role of providing such evidence in a courtroom proceeding.

OBJECTS OF THE INVENTION

It is an object of this invention to provide an improved kit and method of demonstration overcoming some of the problems and shortcomings of techniques and tools of the prior art with respect to preparation of children testimony.

Another object of this invention is to provide an improved kit and method of demonstration of courtroom and trial procedure such that competent, admissible child testimony may be elicited.

Another object of this invention is to provide an improved method for visual demonstration of courtroom and trial procedures relating to child testimony.

Another object of this invention is to provide an improved kit for such demonstrations which may be easily and effectively used, transported, and carried.

These and other important objects will be apparent from the following descriptions and from the drawings.

SUMMARY OF THE INVENTION

This invention represents an improved means for demonstration of courtroom and trial procedure to facilitate the elicitation of competent child testimony. The invention overcomes certain well-known problems and deficiencies, including those outlined above.

The kit and method of this invention allows victim/witness coordinators and others to prepare children for courtroom testimony efficiently and economically, in a manner proven successful. Easy component assembly allows the kit to simulate a variety of anticipated courtroom or testimony situations, with as many repeat simulations as needed for adequate preparation. Transportability enhances comprehension by permitting demonstrations to be conducted in surroundings familiar to the child witness.

This invention is a therapeutic/educational kit for visual demonstration of courtroom procedure including (1) a substantially horizontal base member, having upper and lower surfaces, representing a courtroom; and (2) a plurality of interrelated members representing courtroom fixtures and figurines positioned on and above the upper surface. The fixtures and figurines are erect in demonstration position such that they have proximal portions adjacent to the base and extend substantially upward to terminate in a distal portion above the base. The fixtures and figurines are movable with respect to the base such that assembly, arrangement, and movement thereof alleviates apprehension and concerns associated with a courtroom appearance.

In preferred embodiments, the demonstration kit further includes means to removably engage the fixtures and figurines to the base such that they may be secured during demonstration. In highly preferred embodiments, the securing means comprises first and second fasteners, with the first fastener being a plurality of hooks on the proximal portions of the fixtures and figurines and the second fastener being a plurality of loops on the upper surface of the base.

In preferred embodiments, four substantially vertical walls are secured to the base to form a box representing a courtroom. In highly preferred embodiments, the walls have upper edges to secure a top member which extends over the base to form a cover for the box.

In preferred embodiments, the demonstration kit also includes means removably engaging the lower surface of the base for elevation during demonstration. In highly preferred embodiments, the elevation means comprises a plurality of legs, each having a proximal end, and corresponding attachment members. Removable engagement may be accomplished with the proximal ends and attachment members having male and female configurations, respectively, and a threaded relationship therebetween.

In highly preferred embodiments, the vertical walls include means for removably engaging the top member, such that it is removably secured along the upper edges thereof. Likewise, highly preferred embodiments include a top member which is transparent and handle means secured to the box for transportation.

The method of this invention includes (1) arranging on a base member a plurality of fixture members in proper orientation to simulate the physical setting of a particular courtroom; (2) positioning figurine members with respect to the fixture and base members; and (3) moving the figurines with respect to the fixture and base members, whereby successive stages of a courtroom proceeding may be interactively demonstrated to alleviate concerns and apprehensions associated therewith.

As already noted, familiarity with anticipated courtroom or trial procedure has certain advantages in the preparation of child testimony. The kit and method of this invention allow these advantages to be more fully realized. Each jurisdiction is unique in the manner by which it conducts the actions before it, not only with respect to procedure but also as to the physical setting within which procedural matters are conducted. Furthermore, several courtroom designs may be present within a given facility. Attorneys often familiarize themselves with a courtroom in local procedure before an appearance. It stands to reason that a child witness should be afforded no less an opportunity. (For the purpose of this discussion, the term "fixtures" will be used to indicate the various articles of furniture, trappings, railings, benches, jury boxes, and the like which together make up the physical setting of a courtroom. Likewise, the term "figurines" will refer to courtroom personnel, including but not limited to attorneys, the jury, judge, stenographer, parties to an action, and other witnesses.)

Because the physical layout of courtrooms vary widely any useful demonstration aid must be versatile. The kit of this invention permits fixtures to be arranged, adapted, and assembled within a "courtroom" in any way desired to simulate the exact physical setting in which testimony will later be given. An alternative would be a "walk-through" demonstration in the actual courtroom to be used, but crowded dockets and the resulting scheduling difficulties in most jurisdictions do not permit this as a feasible option.

As previously noted, a courtroom tour is invariably conducted without later participants such as a judge, attorneys, or a full jury. Familiarity with the fixtures, alone, may not adequately prepare a child's testimony. The figurine components of this inventive kit permit an extremely useful interrelationship between participants and the physical setting to be demonstrated to a child witness. As such, the course of an entire courtroom proceeding may be shown from start to finish, through introduction, movement, and manipulation of the figurines with respect to arranged and assembled fixtures.

Preliminary clinical studies indicate the kit and method of this invention provide children with concrete references to the legal process. The invention is a tool by which children may be empowered to communicate their thoughts and feelings about a wide range of issues. The elicitation of competent testimony certainly benefits the justice system. Just as importantly, the invention described herein also meets the needs of a child victim/witness in a more compassionate child-focused manner than otherwise possible.

The kit and method described herein are not only readily stored when not in use, but transportable for use in a child's home or a similar comfortable surrounding. The kit may be assembled and arranged on a table top or set up on a support assembly. In any manner the invention is used, a child is able to interact, with and learn from the demonstration in an environment conducive to maximum comprehension.

Because testimony is invariably required from children of all ages, backgrounds, and stages of development, this inventive kit and method are especially functional. Use of the interrelated figurines, fixtures, and oral explanation may be geared to a particular child witness. Whereas costly video productions and the like may not be sufficiently adaptable, the interrelated components of this kit may be assembled and reassembled as needed and to the extend necessary to afford sufficient comprehension.

Given the nature of the kit and its interrelated movable components, the method of this invention is interactive. The fixtures and figurines promote an active learning process through child participation. Comprehension and familiarity may be directly observed. If it is determined to be less than satisfactory, the demonstration may be adjusted or modified to best suit the needs of a particular child and a particular testimony situation.

DETAILED DESCRIPTION OF THE PREFERRED EMBODIMENTS

Figure 1:
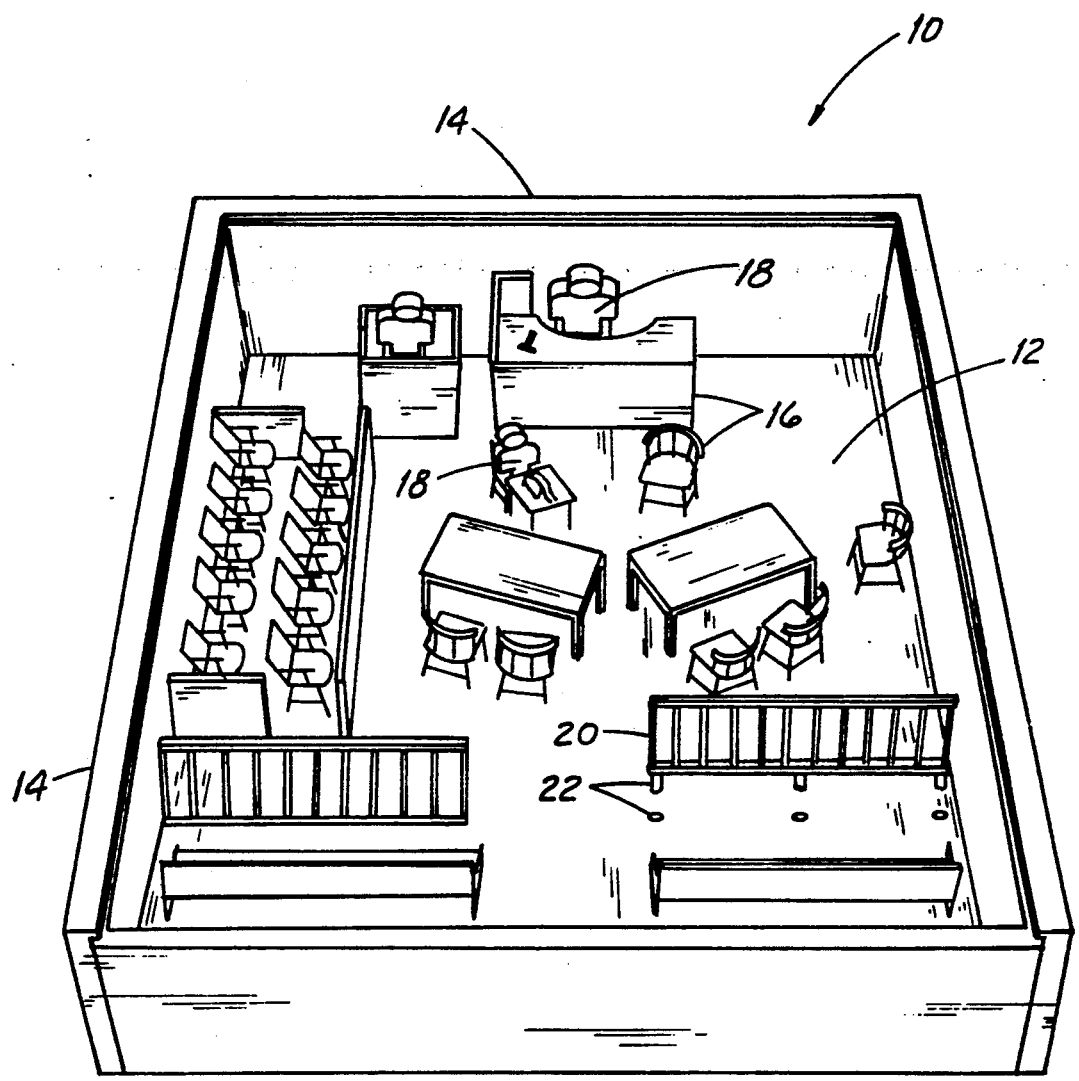
FIG. 1 is a full perspective view of a preferred demonstration kit apparatus in accordance with this invention.

The figures illustrate a demonstration kit 10 which is a preferred embodiment of this invention. The kit includes a unique courtroom configuration, including a base 12 and vertical walls 14. As best shown in FIGURE 1, interrelated fixtures 16 and figurines 18 may be arranged, positioned, and moved with respect to base 12 and walls 14, to simulate a courtroom proceeding. In preferred embodiments, fixtures 16 and figurines, as shown by railing 20, are provided with securing means 22 to permit modification to meet the physical requirements of a particular courtroom.

Figure 2:
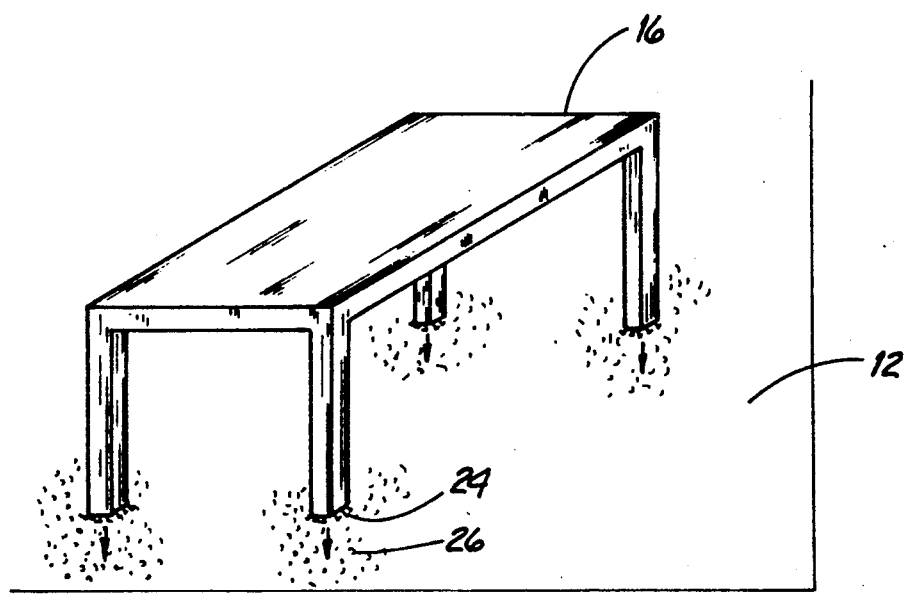
FIG. 2 is an enlarged view of a fixture component of the demonstration kit showing a preferred securing means.

In highly preferred embodiments, as shown in FIG. 2, fixture 16 may be removably engaged to base 12 by first and second fasteners. Fastener 24 is a plurality of hooks on the proximal portions of a fixture or figurine, while fastener 26 is a corresponding plurality of loops on the upper surface of base 12.

Figure 3:
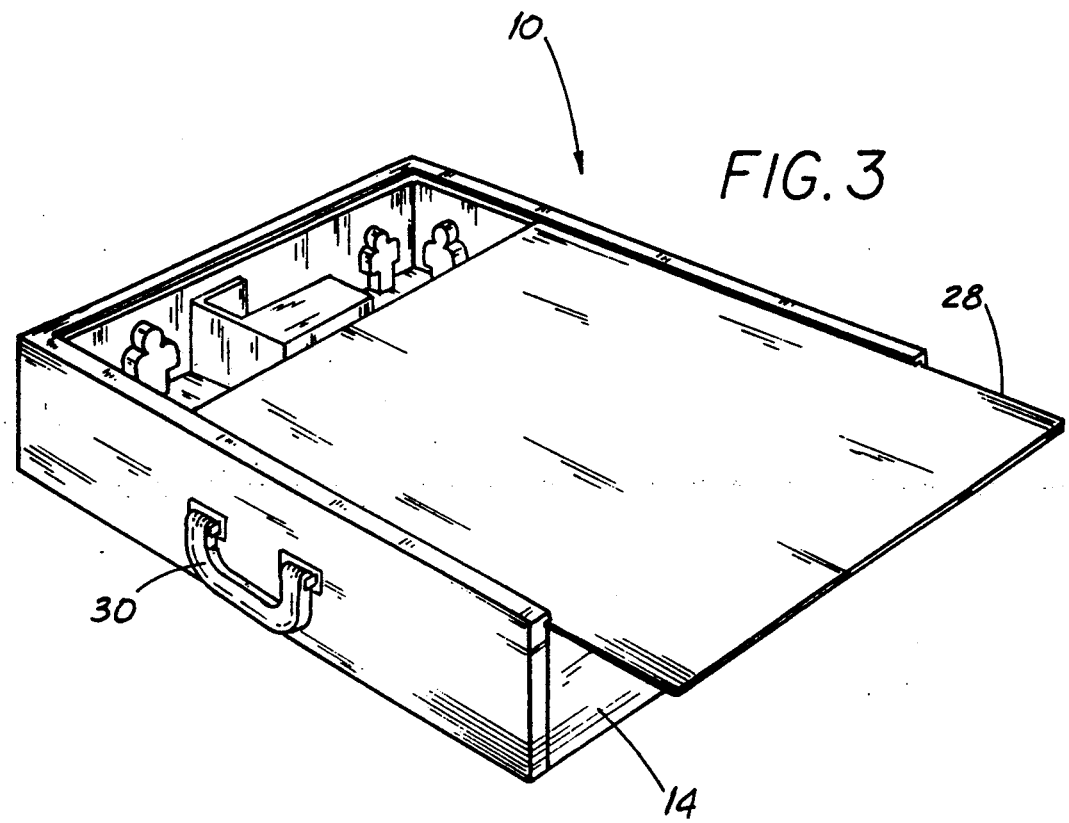
FIG. 3 is a full perspective view of a demonstration kit showing a preferred cover and handle.

In preferred embodiments, kit 10 includes cover 28 and handle means 30 to enhance storage and transportation capabilities. As shown in FIG. 3, fixtures 16 and figurines 18 may be stored under cover 28 and within kit 10, itself, when not in use.

Figure 4:
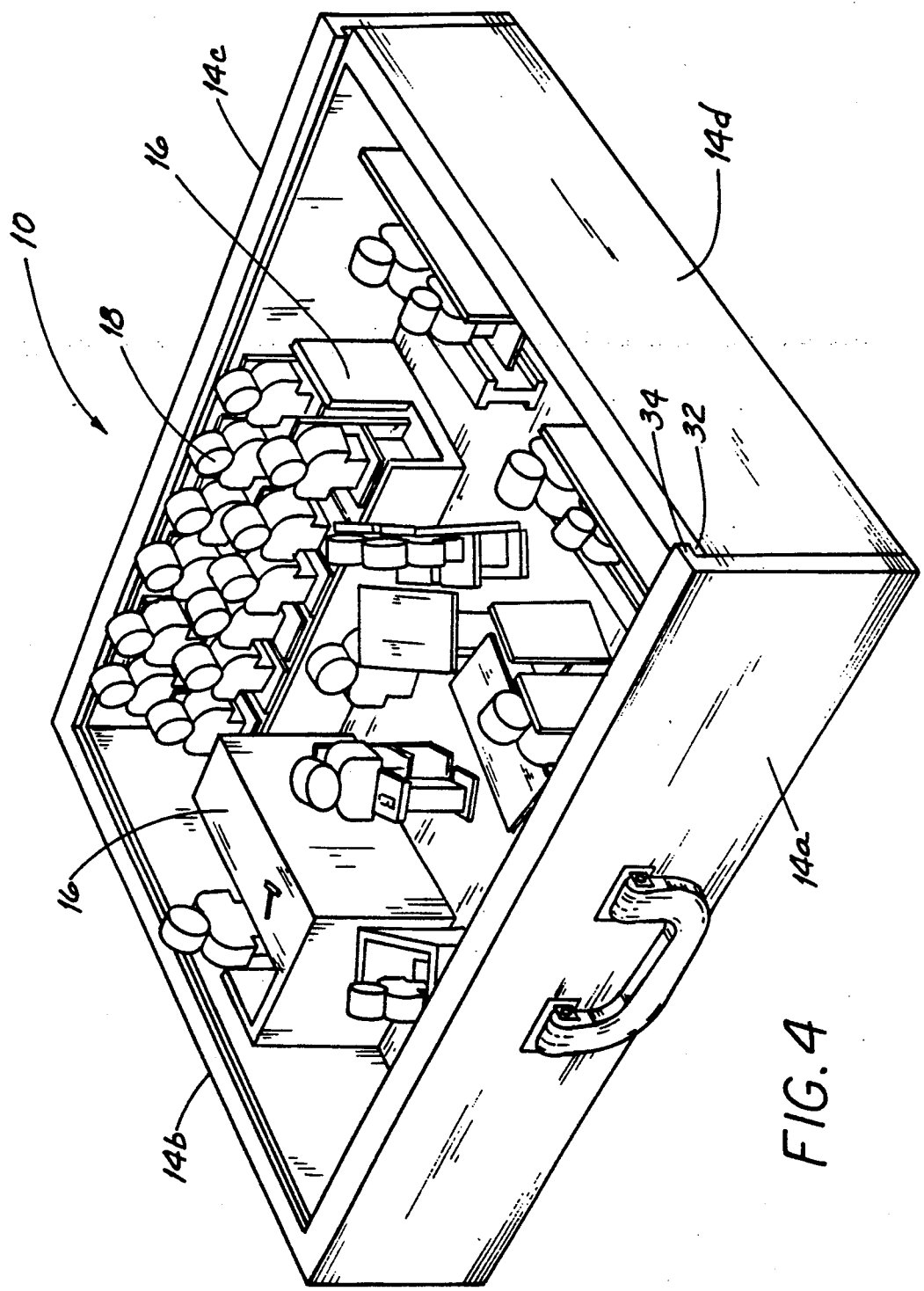
FIG. 4 is an enlarged perspective view of a demonstration kit showing preferred means for removably engaging a cover.

As best shown in FIG. 4, in highly preferred embodiments, means for removably engaging cover 28 comprises lip 34 on walls 14a, 14b, and 14c. The absence of lip 34 on wall 14d provides groove 32 within which cover 28 fits and slides through to enclose fixtures 16 and figurines 18 within kit 10.

Figure 5:
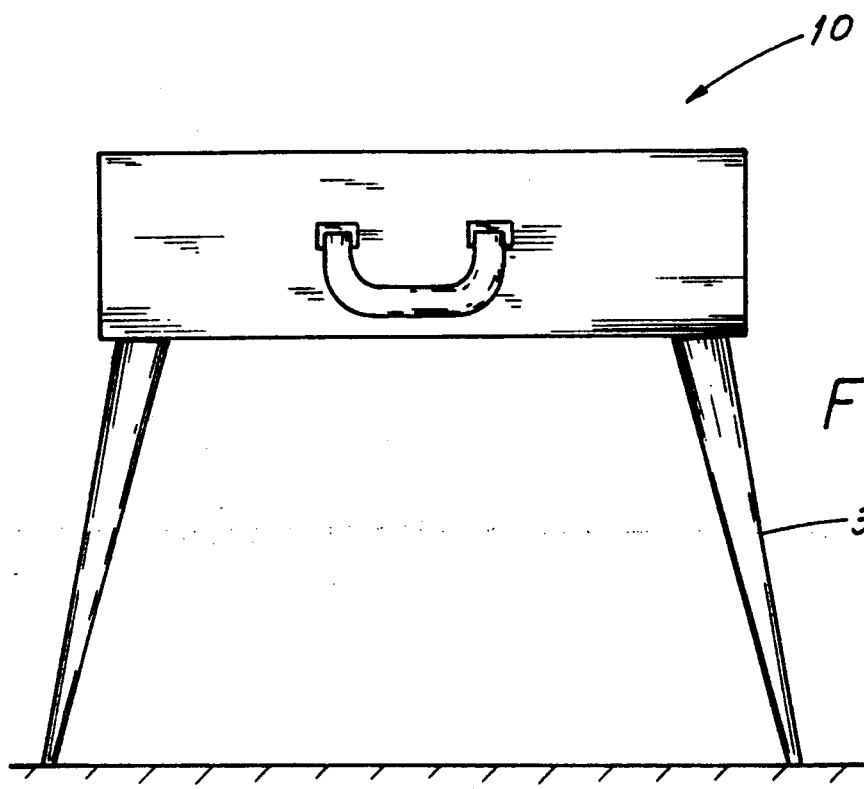
FIG. 5 is a side-edge elevation view of a demonstration kit, showing preferred leg support.
Figure 6:
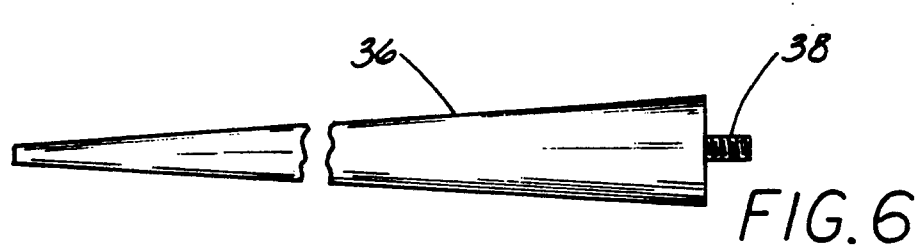
FIG. 6 is a fragmentary view of a preferred leg support.
Figure 7:
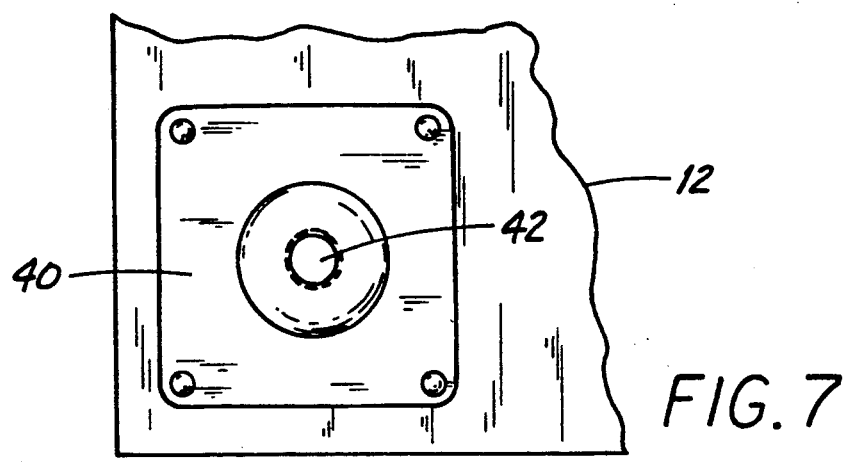
FIG. 7 is an enlarged, fragmentary face view of a preferred leg attachment.

In preferred embodiments, as shown in FIG. 5, leg supports 36 may accompany kit 10. In highly preferred embodiments, legs 36 are removably engaged to the lower surface of base 12. The proximal end 38 of leg 36 corresponds to and removably engages attachment member 40 on base 12. In highly preferred embodiments, as best shown in FIGS. 6 and 7, proximal end 38 and insertion portion 42 of member 40 have a threaded relationship. Storage and transportation are facilitated by removing legs 36 from base member 12 and storing them within kit 10.

Kit 10 may be made using a variety of materials. Preferred materials include rigid plastics with high-impact strengths, wood, and various metal materials. A combination of ply- and soft woods are highly preferred on the basis of performance and durability. The box of kit 10 may be obtained from Miniature Village of Kenosha, Wis. The cover [28] may be transparent.

Likewise, fixtures 16 and figurines 18 may be made using a variety of materials. Hard rubber, rigid plastics, various pliable synthetic composites and wood are suitable and available from sources known to those skilled in the art who are made aware of this invention. Suitable figurines are those with a variety of gender, racial, and appearance characteristics such that any demonstration may be presented as realistic as possible. Acceptable material choices for legs 36, attachment members 40, handle means 30, and fasteners 24 and 26 and sources thereof will, likewise, be apparent.

This invention has been described in connection with the demonstration of courtroom and trial procedure in preparation of child testimony. However, the invention has applications beyond those described above, including but not limited to recreation of crime and accident scenes. While the kit and method of this invention have been described in the context of criminal prosecution and child testimony, the invention may also be used with children whose parents are involved in divorce or custody proceedings, or those who are introduced to the social service system and the wide range of issues associated therewith. Likewise, use of the invention is not limited to children, but includes learning impaired adults, as well as anyone uncertain and apprehensive with respect to courtroom and trial procedure.

While the principles of this invention have been described in connection with specific embodiments, it should be understood clearly that these descriptions are made only by way of example and are not intended to limit the scope of the invention. For instance, with respect to the kit of this invention, removable engagement of the fixtures and figurines with the base member may be accomplished magnetically. The scope of this invention also contemplates a leg support assembly which folds or collapses upon itself or within the base member.

We claim:

1. A therapeutic/educational kit for visual demonstration of courtroom and trial procedure comprising:
   a substantially horizontal base member representing a courtroom, said base member having upper and lower surfaces; and
   a plurality of interrelated members representing courtroom fixtures and figurines on and above the base member upper surface, each of said interrelated members being erect in demonstration position, having a proximal portion adjacent to the base member, and extending substantially upward to terminate in a distal portion above the base member, each of said interrelated members movable with respect to the base member,
   whereby apprehension and concerns associated with a courtroom appearance are alleviated through assembly and movement of the fixture and figurine members.

2. The kit of claim 1 further comprising means removably engaging said interrelated members to said base member to secure each of said interrelated members during demonstration.

3. The kit of claim 2 wherein the securing means comprises first and second fasteners, said first fastener is a plurality of hooks on the proximal portions of said interrelated members, and said second fastener is a plurality of loops on said upper surface of said base member.

4. The kit of claim 1 further comprising four substantially vertical walls secured to said base member and extending substantially upwardly therefrom to form a box representing a courtroom.

5. The kit of claim 4 further comprising means removably engaging said interrelated members to said base member to secure each of said interrelated members during demonstration.

6. The kit of claim 5 wherein the securing means comprises first and second fasteners, said first fastener is a plurality of hooks on the proximal portions of said interrelated members, and said second fastener is a plurality of loops on said upper surface of said base member.

7. The kit of claim 4 further comprising elevation means removably engaging said lower surface of said base member to elevate said base member during demonstation.

8. The kit of claim 7 wherein the elevation means comprises:

a plurality of legs, each having a proximal end; and corresponding attachment members.

9. The kit of claim 8 wherein the attachment members are female and the proximal ends are male, said attachment members and proximal ends in threaded relationship.

10. The kit of claim 4 wherein the walls have upper edges and further comprising a top member secured along said upper edges of said walls and extending over said base member to form a cover.

11. The kit of claim 10 further comprising means removably engaging said interrelated members to said base member to secure each of said interrelated members during demonstration.

12. The kit of claim 11 wherein the securing means comprises first and second fasteners, said first fastener is a plurality of hooks on the proximal portions of said interrelated members and said second fastener is a plurality of loops of said upper surface of said base member.

13. The kit of claim 10 further comprising elevation means removably engaging said lower surface of said base member to elevate said base member during demonstration.

14. The kit of claim 13 wherein the elevation means comprises:

a plurality of legs, each having a proximal end; and corresponding attachment members.

15. The kit of claim 14 wherein the attachment members are female and the proximal ends are male, said attachment members and proximal ends in threaded relationship.

16. The kit of claim 10 wherein the vertical walls comprise means for removably engaging said top member.

17. The kit of claim 16 wherein the top member is removably secured along said upper edges.

18. The kit of claim 17 wherein the cover is transparent.

19. The kit of claim 10 further comprising handle means secured to the box for transportation.

20. A method for visually demonstrating courtroom and trial procedure comprising:

arranging on a base member a plurality of fixture members in proper orientation to simulate a courtroom, said fixture members being substantially erect in demonstration position, having proximal portions adjacent to said base member and extending substantially upward;

positioning figurine members with respect to said fixture member and said base members; and moving the figurine members with respect to said fixture members and said base member, whereby the figurine members represent a judge, attorneys, a jury, witnesses, and other courtroom personnel at successive stages of a courtroom proceeding thereby interactively demonstrating certain aspects of such a proceeding to alleviate apprehension and concerns associated therewith.

* * * * *

UNITED STATES PATENT AND TRADEMARK OFFICE
CERTIFICATE OF CORRECTION

PATENT NO. : 5,201,660

DATED : April 13, 1993

INVENTOR(S) : Lynn Copen and Harvey Knapp

It is certified that error appears in the above-identified patent and that said Letters Patent is hereby corrected as shown below:

In Column 5, line 60, change "[28]" to --28--.

In claim 11, line 3, change "base member to" to --base to--.

In claim 20, line 12, change "fixture members" to --fixture member--.

Signed and Sealed this

Twenty-fifth Day of January, 1994

Attest:

BRUCE LEHMAN

*Attesting Officer*     *Commissioner of Patents and Trademarks*